US009588957B2

(12) United States Patent
Miyata et al.

(10) Patent No.: US 9,588,957 B2
(45) Date of Patent: Mar. 7, 2017

(54) DICTIONARY UPDATE METHOD, DICTIONARY UPDATE SYSTEM, AND DICTIONARY UPDATE PROGRAM

(71) Applicant: BIGLOBE Inc., Tokyo (JP)

(72) Inventors: Michitaro Miyata, Tokyo (JP); Kyoji Hirata, Tokyo (JP); Takeshi Kawasaki, Tokyo (JP); Kazuya Furukawa, Tokyo (JP)

(73) Assignee: Biglobe, Inc., Tokyo (JP)

( * ) Notice: Subject to any disclaimer, the term of this patent is extended or adjusted under 35 U.S.C. 154(b) by 51 days.

(21) Appl. No.: 14/429,275

(22) PCT Filed: Jul. 19, 2013

(86) PCT No.: PCT/JP2013/070260
§ 371 (c)(1),
(2) Date: Mar. 18, 2015

(87) PCT Pub. No.: WO2014/045713
PCT Pub. Date: Mar. 27, 2014

(65) Prior Publication Data
US 2015/0234808 A1 Aug. 20, 2015

(30) Foreign Application Priority Data

Sep. 18, 2012 (JP) ................................ 2012-203839

(51) Int. Cl.
*G06K 9/62* (2006.01)
*G06F 17/27* (2006.01)
*G06K 9/00* (2006.01)

(52) U.S. Cl.
CPC ..... *G06F 17/2735* (2013.01); *G06K 9/00221* (2013.01)

(58) Field of Classification Search
CPC .. G06K 9/00926; G06K 9/00221–2009/00328
See application file for complete search history.

(56) References Cited

U.S. PATENT DOCUMENTS 5,999,637 A * 12/1999 Toyoda .............. G06Q 20/4014
                                                        382/124
2013/0039590 A1* 2/2013 Yoshio ............... G06K 9/00288
                                                        382/218

FOREIGN PATENT DOCUMENTS

JP  2002-163654 A  6/2002
JP  2004-157602 A  6/2004
(Continued)

OTHER PUBLICATIONS

Japanese Office Action dated Mar. 17, 2015 cited by Japanese Patent Office in Japanese Patent Application No. 2012-203839, to which this application claims priority (3 pages).

(Continued)

*Primary Examiner* — Brian P Werner
(74) *Attorney, Agent, or Firm* — Mark Malek; Daniel Pierron; Widerman Malek, PL

(57) ABSTRACT

In object recognition using image information, countermeasures are taken for reducing erroneous judgment caused when the similarity between a visual feature of an object image and a visual feature of dictionary data of another object becomes high in association with a temporal change. In a dictionary update method for a computer for updating dictionary data in which a visual feature of an object which a user desires to recognize is registered: when there are a plurality of data pieces having a visual feature similar to the inputted inquiry image, visual features of a plurality of objects are concluded as being similar and hence the pair of objects are accumulated into a similar object accumulation section; and when the objects accumulated in the similar object accumulation section have reached a condition set forth in advance, data having the visual features of the objects having reached the condition is concluded as requir- (Continued)

ing update and hence update is recommended to a user having registered the object.

10 Claims, 17 Drawing Sheets

(56) References Cited

FOREIGN PATENT DOCUMENTS

| JP | 2006-099374 A | 4/2006 |
|----|---------------|--------|
| JP | 2008-102770 A | 5/2008 |
| JP | 2012-014568 A | 1/2012 |
| JP | 2012-123526 | 6/2012 |
| WO | WO 2010/106644 A1 | 9/2010 |

OTHER PUBLICATIONS

English Translation of Japanese Office Action dated Mar. 17, 2015 cited by Japanese Patent Office in Japanese Patent Application No. 2012-203839, to which this application claims priority (3 pages).
International Search Report mailed Oct. 29, 2013, cited by Japanese Patent Office, and which was cited in the international patent application PCT/JP2013/070260, filed Jul. 19, 2013, to which this application claims priority (2 pages).

* cited by examiner

F I G. 1
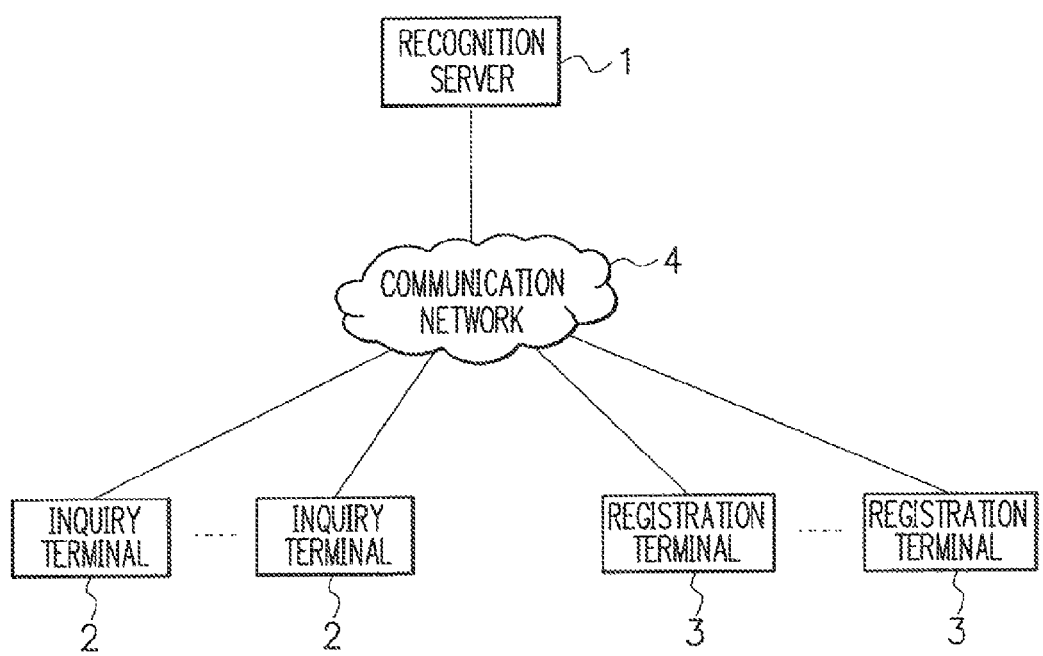

F I G. 3
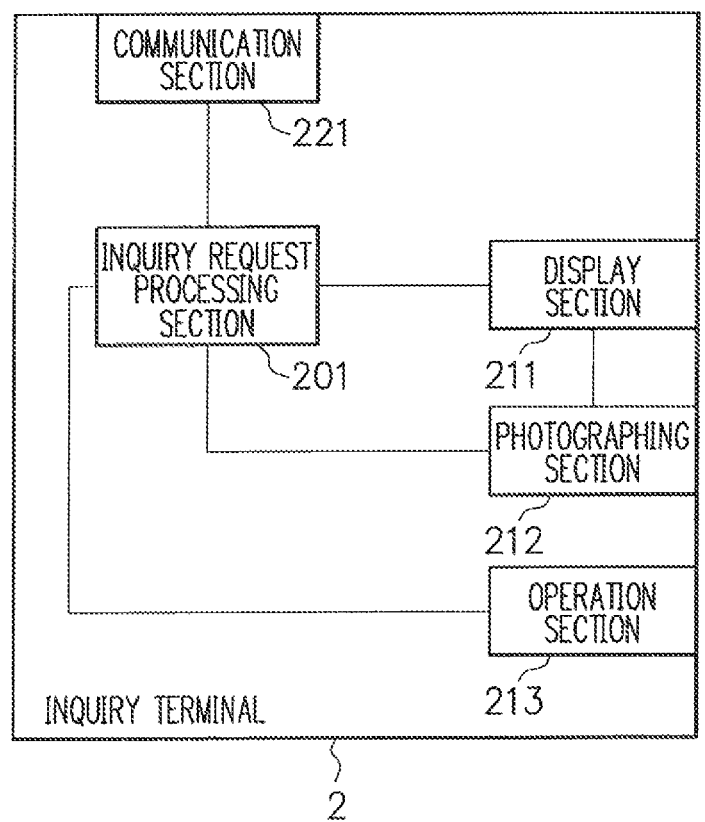

DICTIONARY DATA STORAGE SECTION

| | REGISTERED PERSON ID | REGISTERED PERSON NAME | REGISTERED PERSON NOTIFICATION DESTINATION INFORMATION | IMAGE | FEATURE QUANTITY |
|---|---|---|---|---|---|
| 121 | | | | | |
| | | | | | |
| | | | | | |
| | | | | | |

FIG. 6

SIMILARITY TEMPORARY STORAGE SECTION

122 —

| REGISTERED PERSON ID | SIMILARITY |
|---|---|
|  |  |
|  |  |
|  |  |
|  |  |

FIG. 7

SIMILAR TARGET STORAGE SECTION

123 —

| REGISTERED PERSON ID | REGISTERED PERSON ID | NUMBER OF TIMES |
|---|---|---|
|  |  |  |
|  |  |  |
|  |  |  |
|  |  |  |

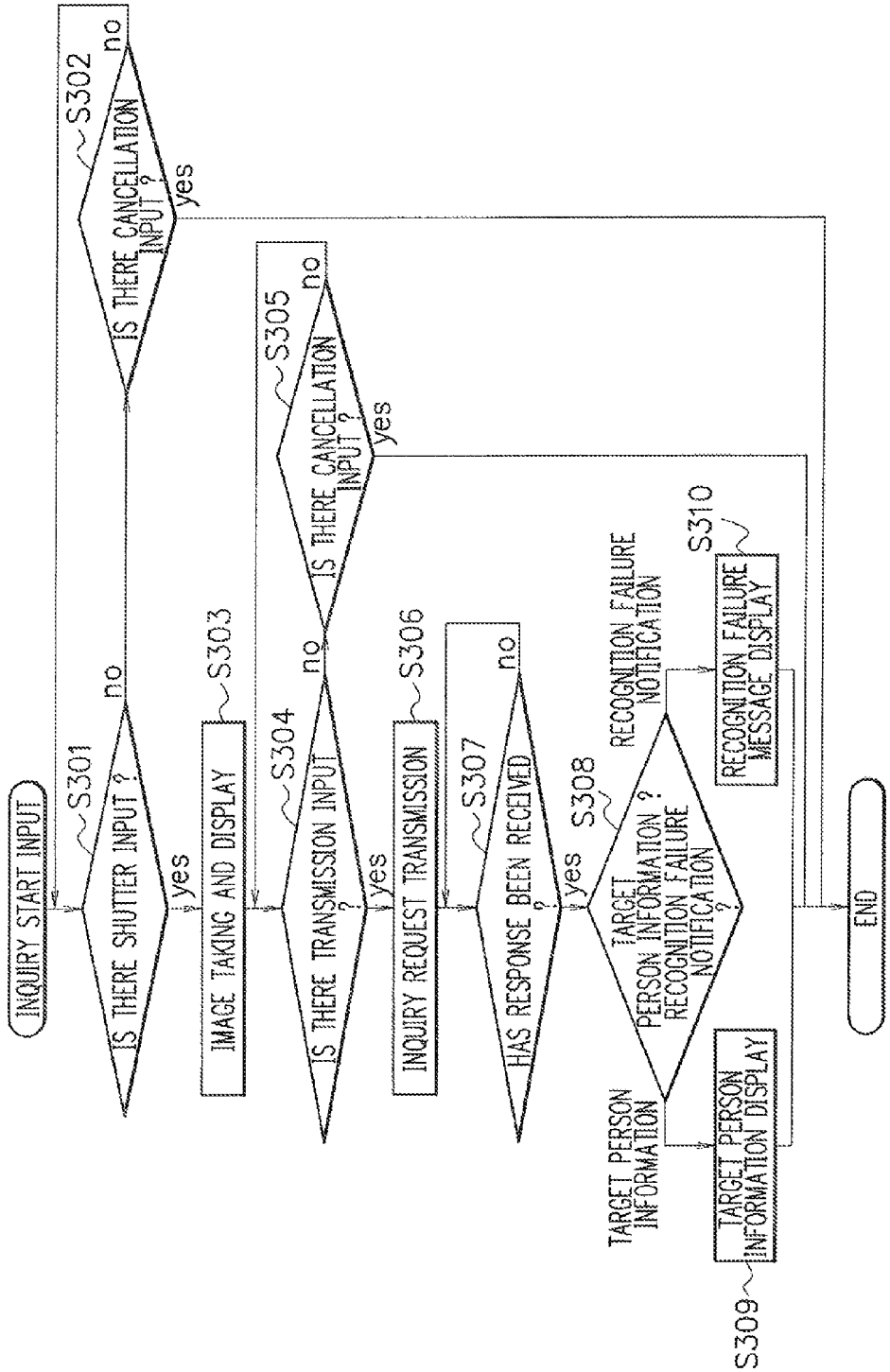

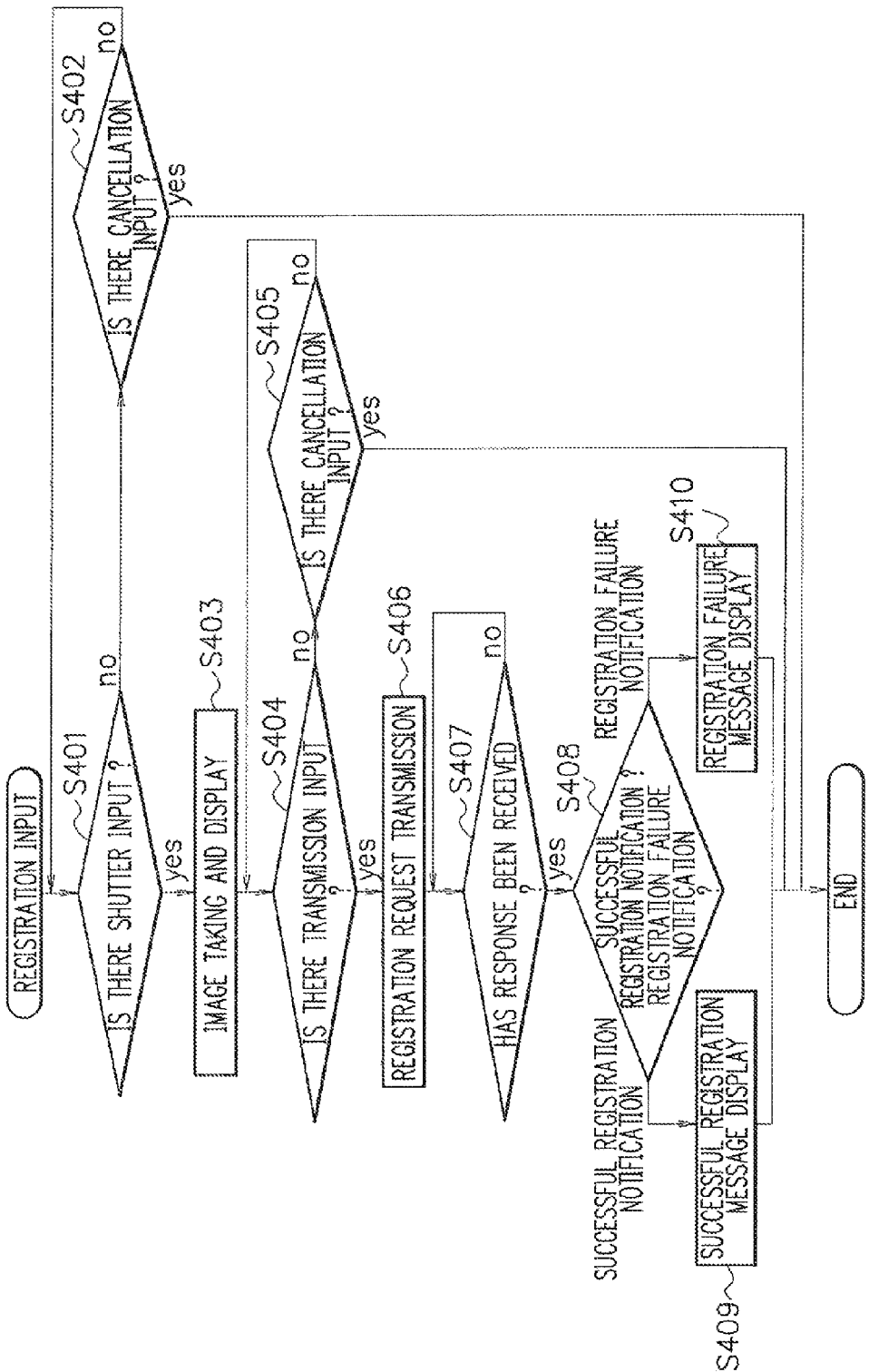

F I G. 12

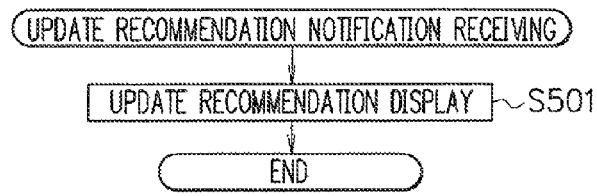

F I G. 13

DICTIONARY DATA STORAGE SECTION

| REGISTERED PERSON ID | REGISTERED PERSON NAME | REGISTERED PERSON NOTIFICATION DESTINATION INFORMATION | IMAGE | FEATURE QUANTITY |
|---|---|---|---|---|
| 1 | AAA | a@aa... | (FACE IMAGE 1 OF AAA) | h84qe7... |
| 2 | BBB | b@bb... | (FACE IMAGE 1 OF BBB) | 70qd46... |
| ... | ... | ... | ... | ... |
| 10 | JJJ | j@jj... | (FACE IMAGE 1 OF JJJ) | a4x5e2... |
| ... | ... | ... | ... | ... |

121

F I G. 14

DICTIONARY DATA STORAGE SECTION

| REGISTERED PERSON ID | REGISTERED PERSON NAME | REGISTERED PERSON NOTIFICATION DESTINATION INFORMATION | IMAGE | FEATURE QUANTITY |
|---|---|---|---|---|
| 1 | AAA | a@aa... | (FACE IMAGE 1 OF AAA) | h84qe7... |
| 2 | BBB | b@bb... | (FACE IMAGE 1 OF BBB) | 70qd46... |
| ... | ... | ... | ... | ... |
| 10 | JJJ | j@jj... | (FACE IMAGE 2 OF JJJ) | 70rl75... |
| ... | ... | ... | ... | ... |

121

F I G. 15

DICTIONARY DATA STORAGE SECTION

| | REGISTERED PERSON ID | REGISTERED PERSON NAME | REGISTERED PERSON NOTIFICATION DESTINATION INFORMATION | IMAGE | FEATURE QUANTITY |
|---|---|---|---|---|---|
| 121 | 1 | AAA | a@aa… | (FACE IMAGE 1 OF AAA) | h84qe7… |
| | 2 | BBB | b@bb… | (FACE IMAGE 2 OF BBB) | i40qje… |
| | … | … | … | … | … |
| | 10 | JJJ | j@jj… | (FACE IMAGE 1 OF JJJ) | a4x5e2… |
| | … | … | … | … | … |

F I G. 16

SIMILARITY TEMPORARY STORAGE SECTION

| | REGISTERED PERSON ID | SIMILARITY |
|---|---|---|
| 122 | 1 | 0.01 |
| | 2 | 0.82 |
| | … | … |
| | 10 | 0.73 |
| | … | … |

F I G. 17

SIMILARITY TEMPORARY STORAGE SECTION

| | REGISTERED PERSON ID | SIMILARITY |
|---|---|---|
| 122 | 1 | 0.02 |
| | 2 | 0.81 |
| | … | … |
| | 10 | 0.23 |
| | … | … |

F I G. 18

SIMILARITY TEMPORARY STORAGE SECTION

122 ~

| REGISTERED PERSON ID | SIMILARITY |
|---|---|
| 1 | 0.02 |
| 2 | 0.95 |
| ... | ... |
| 10 | 0.73 |
| ... | ... |

F I G. 19

SIMILAR TARGET STORAGE SECTION

123 ~

| REGISTERED PERSON ID | REGISTERED PERSON ID | NUMBER OF TIMES |
|---|---|---|
| 1 | 5 | 1 |
| 2 | 10 | 4 |
| 14 | 23 | 2 |

F I G. 20

SIMILAR TARGET STORAGE SECTION

123 ~

| REGISTERED PERSON ID | REGISTERED PERSON ID | NUMBER OF TIMES |
|---|---|---|
| 1 | 5 | 1 |
| 2 | 10 | 5 |
| 14 | 23 | 2 |

F I G. 21

SIMILAR TARGET STORAGE SECTION

123 ~

| REGISTERED PERSON ID | REGISTERED PERSON ID | NUMBER OF TIMES |
|---|---|---|
| 1 | 5 | 1 |
| 14 | 23 | 2 |

FIG. 22
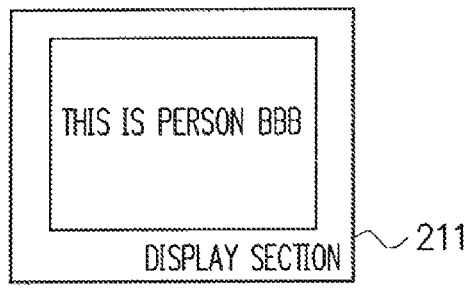
FIG. 23
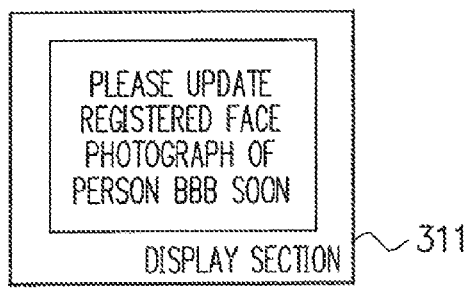
FIG. 24
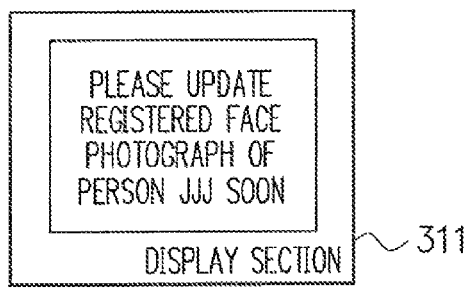
FIG. 25
| SIMILAR TARGET STORAGE SECTION | |
|---|---|
| REGISTERED PERSON ID | REGISTERED PERSON ID |
| | |
| | |
| | |
| | |
123

F I G. 27

SIMILAR TARGET STORAGE SECTION

| REGISTERED PERSON ID | REGISTERED PERSON ID |
|---|---|
| 1 | 10 |
| 1 | 23 |
| 3 | 7 |
| 3 | 10 |
| 3 | 54 |
| 7 | 17 |
| 10 | 43 |
| 10 | 48 |
| 18 | 22 |

123

F I G. 28

SIMILAR TARGET STORAGE SECTION

| REGISTERED PERSON ID | REGISTERED PERSON ID |
|---|---|
| 1 | 10 |
| 1 | 23 |
| 3 | 7 |
| 3 | 10 |
| 3 | 54 |
| 7 | 17 |
| 10 | 43 |
| 10 | 48 |
| 18 | 22 |
| 20 | 10 |

123

F I G. 29

SIMILAR TARGET STORAGE SECTION

| REGISTERED PERSON ID | REGISTERED PERSON ID |
|---|---|
| 1 | 23 |
| 3 | 7 |
| 3 | 54 |
| 7 | 17 |
| 18 | 22 |

123

F I G. 31

SIMILAR TARGET STORAGE SECTION

123

| REGISTERED PERSON ID | REGISTERED PERSON ID | NUMBER OF TIMES |
|---|---|---|
| 1 | 10 | 1 |
| 1 | 23 | 2 |
| 3 | 7 | 1 |
| 3 | 10 | 3 |
| 3 | 54 | 1 |
| 7 | 17 | 1 |
| 10 | 43 | 1 |
| 10 | 48 | 2 |
| 18 | 22 | 1 |

F I G. 32

SIMILAR TARGET STORAGE SECTION

123

| REGISTERED PERSON ID | REGISTERED PERSON ID | NUMBER OF TIMES |
|---|---|---|
| 1 | 10 | 2 |
| 1 | 23 | 2 |
| 3 | 7 | 1 |
| 3 | 10 | 3 |
| 3 | 54 | 1 |
| 7 | 17 | 1 |
| 10 | 43 | 1 |
| 10 | 48 | 2 |
| 18 | 22 | 1 |

F I G. 33

SIMILAR TARGET STORAGE SECTION

123

| REGISTERED PERSON ID | REGISTERED PERSON ID | NUMBER OF TIMES |
|---|---|---|
| 1 | 23 | 2 |
| 3 | 7 | 1 |
| 3 | 54 | 1 |
| 7 | 17 | 1 |
| 18 | 22 | 1 |

DICTIONARY UPDATE METHOD, DICTIONARY UPDATE SYSTEM, AND DICTIONARY UPDATE PROGRAM

CROSS REFERENCE TO RELATED APPLICATIONS

This is a national stage application under 35 U.S.C. §371 of PCT patent application PCT/JP2013/070260, filed on Jul. 19, 2013, which claims the benefit of JP 2012-203839, filed on Sep. 18, 2012, each of which is hereby incorporated by reference in its entirety.

TECHNICAL FIELD

The present invention relates to a dictionary update method, a dictionary update system, and a dictionary update program for an authentication device for recognizing an object on the basis of image information.

BACKGROUND ART

Techniques of recognizing an object on the basis of the similarity of a visual feature are known. For example, techniques of recognizing a person by using an image of biological information such as a face and a fingerprint have been developed for the purpose of administration and the like.

In such recognition techniques, typically, the feature of an image registered in advance and referred to as dictionary data is compared with the feature of an inputted image so that one having the highest similarity in the feature or alternatively having a similarity exceeding a predetermined threshold is judged as an image of the corresponding object. In particular, in a case that the visual feature of an object can suffer a temporal change like in a case that a person is to be recognized by using a face image, for the purpose of improving the recognition accuracy also against a temporal change, techniques of performing addition or update by using the inputted data as registered data have been proposed.

For example, Patent Document 1 and Patent Document 2 disclose techniques of, in accordance with the magnitude of the similarity in the feature between an inputted image and an image recognized as an object, adding the inputted image as registered data. Further, Patent Document 3 discloses a technique of, in accordance with the number of times of input of an input image performed until the authenticating processing becomes successful or alternatively in accordance with the time having elapsed since the last date of update of the dictionary, updating the dictionary by using the input image as new registered data.

PRIOR ART REFERENCE

Patent Document

Patent Document 1: Japanese Patent Laid-Open Publication No 2012-14568
Patent Document 2: Japanese Patent Laid-Open Publication No. 2004-157602
Patent Document 3: Japanese Patent Laid-Open Publication No 2002-163654

SUMMARY OF THE INVENTION

Problems to be Solved by the Invention

Nevertheless, in the method of updating dictionary data in accordance with a temporal change in the object serving as a related image input target, although decrease in the recognition accuracy caused by the temporal change in the object itself can be avoided, decrease in the recognition accuracy caused when the similarity to another object registered in the dictionary increases cannot be avoided.

As an example, in person recognition using face images, a case is considered that features of the face images of person A and person B are registered in a dictionary. In a situation that, owing to a temporal change, the visual feature of the face image of person A has become close to the visual feature of the face image of person B registered as dictionary data, a possibility increases that, when a face image of person A is inputted, it is judged erroneously as person B.

An object of the present invention is, in object recognition using image information, to provide countermeasures for reducing erroneous judgment caused when the similarity between a visual feature of an object image and a visual feature of dictionary data of another object becomes high.

Means for Solving to the Problems

In view of the above-mentioned problem, a mode of the present invention relates to a dictionary update method for a computer for updating dictionary data in which a visual feature of an object which a user desires to recognize is registered, wherein: when there are a plurality of data pieces having a visual feature similar to the inputted inquiry image, visual features of the plurality of objects are concluded as being similar and hence the pair of objects are accumulated into a similar object accumulation section; and when the objects accumulated in the similar object accumulation section have reached a condition set forth in advance, data having the visual features of the objects having reached the condition is concluded as requiring update and hence update is recommended to a user having registered the object.

Another mode of the present invention relates to a dictionary update system for updating dictionary data in which a visual feature of an object which a user desires to recognize is registered as data, comprising: a control section for, when there are a plurality of data pieces having a visual feature similar to the inputted inquiry image, concluding visual features of the plurality of objects as being similar, and hence accumulating the pair of objects into a similar object accumulation section; and an update section for, when the objects accumulated in the similar object accumulation section have reached a condition set forth in advance, concluding data having the visual features of the objects having reached the condition, as requiring update, and hence recommending update to a user having registered the object.

Yet another mode of the present invention relates to a dictionary update program for updating dictionary data in which a visual feature of an object which a user desires to recognize is registered as data, causing a computer to execute: the processing of when there are a plurality of data pieces having a visual feature similar to the inputted inquiry image, concluding visual features of the plurality of objects as being similar and hence accumulating the pair of objects into a similar object accumulation section; and the processing of when the objects accumulated in the similar object accumulation section have reached a condition set forth in advance, concluding data having the visual features of the objects having reached the condition, as requiring update, and hence recommending update to a user having registered the object.

Advantageous Effects of the Invention

According to the present invention, in object recognition using image information, erroneous recognition as another object registered in a dictionary can be reduced.

BRIEF DESCRIPTION OF THE DRAWINGS

Further advantages and embodiments of the present invention are explained below in detail on the basis of description and drawings.

FIG. 1 is a block diagram showing a configuration of an entire system in a first to a third embodiment of the present invention.

FIG. 3 is a block diagram showing a configuration of an inquiry terminal 2 in a first to a third embodiment of the present invention.

FIG. 6 is a block diagram showing a configuration of a similarity temporary storage section 122 in a first to a third embodiment of the present invention.

FIG. 7 is a block diagram showing a configuration of a similar target storage section 123 in a first and a third embodiment of the present invention.

FIG. 10 is a flow chart describing operation of an inquiry terminal 2 in a first to a third embodiment of the present invention.

FIG. 11 is a flow chart describing operation of a registration terminal 3 in a first to a third embodiment of the present invention.

FIG. 12 is a flow chart describing operation of a registration terminal 3 in a first to a third embodiment of the present invention.

FIG. 13 is a diagram showing a state of a dictionary data storage section 121 in implementation example 1 of the present invention.

FIG. 14 is a diagram showing a state of a dictionary data storage section 121 in implementation example 1 of the present invention.

FIG. 15 is a diagram showing a state of a dictionary data storage section 121 in implementation example 1 of the present invention.

FIG. 16 is a diagram showing a state of a similarity temporary storage section 122 in implementation example 1 of the present invention.

FIG. 17 is a diagram showing a state of a similarity temporary storage section 122 in implementation example 1 of the present invention.

FIG. 18 is a diagram showing a state of a similarity temporary storage section 122 in implementation example 1 of the present invention.

FIG. 19 is a diagram showing a state of a similar target storage section 123 in implementation example 1 of the present invention.

FIG. 20 is a diagram showing a state of a similar target storage section 123 in implementation example 1 of the present invention.

FIG. 21 is a diagram showing a state of a similar target storage section 123 in implementation example 1 of the present invention.

FIG. 22 is a diagram showing a state of a display section 211 in implementation example 1 of the present invention.

FIG. 23 is a diagram showing a state of a display section 311 in implementation example 1 of the present invention.

FIG. 24 is a diagram showing a state of a display section 311 in implementation example 1 of the present invention.

FIG. 25 is a block diagram showing a configuration of a similar target storage section 123 in a second embodiment of the present invention.

FIG. 27 is a diagram showing a state of a similar target storage section 123 in implementation example 2 of the present invention.

FIG. 28 is a diagram showing a state of a similar target storage section 123 in implementation example 2 of the present invention.

FIG. 29 is a diagram showing a state of a similar target storage section 123 in implementation example 2 of the present invention.

FIG. 31 is a diagram showing a state of a similar target storage section 123 in implementation example 3 of the present invention.

FIG. 32 is a diagram showing a state of a similar target storage section 123 in implementation example 3 of the present invention.

FIG. 33 is a diagram showing a state of a similar target storage section 123 in implementation example 3 of the present invention.

DESCRIPTION OF THE EMBODIMENTS

Figure 2:
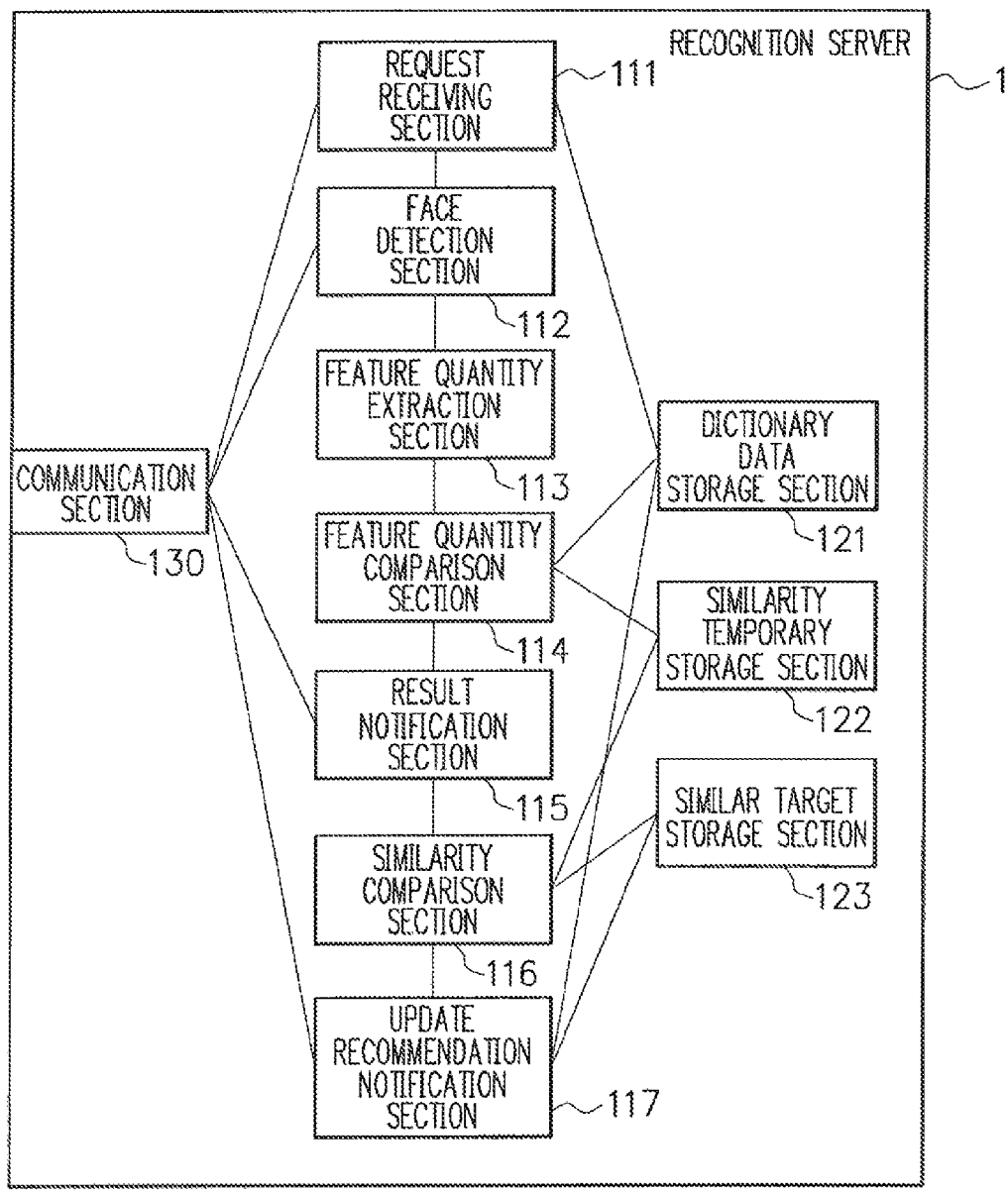
FIG. 2 is a block diagram showing a configuration of a recognition server 1 in a first to a third embodiment of the present invention.

Next, embodiments of the present invention are described below in detail with reference to the drawings.
<First Embodiment>
In the present embodiment, the present invention is described with reference to an example of a face recognition system for recognizing a person by using a face image.

FIG. 1 is a diagram showing the first embodiment of the present invention. As shown in FIG. 1, the embodiment of the present invention is constructed from a recognition server 1, one or more inquiry terminals 2, one or more registration terminals 3, and a communication network 4. Connection through the communication network 4 is established between the recognition server 1 and the inquiry terminal 2 and between the recognition server 2 and the registration terminal 3.

The recognition server 1 receives an inquiry request from the inquiry terminal 2, then compares the feature quantity between a face image transmitted from the inquiry terminal 2 and dictionary data stored in the recognition server 1, thereby performs the person judgment for the transmitted face image, and then transmits the result to the inquiry terminal 2. Further, the recognition server 1 receives a registration request from the registration terminal 3 and then registers as dictionary data a face image transmitted from the registration terminal 3 and the feature quantity thereof.

FIG. 2 is a diagram showing an example of the internal structure of the recognition server 1 shown in FIG. 1. The recognition server 1 shown in FIG. 2 is constructed from a request receiving section 111, a face detection section 112, a feature quantity extraction section 113, a feature quantity comparison section 114, a result notification section 115, a similarity comparison section 116, an update recommendation notification section 117, a dictionary data storage section 121, a similarity temporary storage section 122, a similar target storage section 123, and a communication section 130.

The request receiving section 111 receives an inquiry request transmitted from the inquiry terminal 2 or a registration request transmitted from the registration terminal 3 and then judges processing in accordance with the contents of the request. The face detection section 112 detects a human face from a received image.

The feature quantity extraction section 113 extracts a feature quantity from the face image detected by the face detection section 112. The feature quantity comparison section 114 calculates the similarity between the feature quantity extracted by the feature quantity extraction section 113 and the feature quantity stored in the dictionary data storage section 121 and then stores the calculated similarity into the similarity temporary storage section 122. Further, the feature quantity extraction section 113 judges a target person by using the calculated similarity. Further, the feature quantity extraction section 113 performs comparison of the magnitude of each calculated similarity and then, when the magnitude of the similarity is lower than or equal to a predetermined threshold, stores it into the similar target storage section 123. The detection of a face, the feature quantity extraction of a face image, and the calculation of a similarity by comparison of a feature quantity are publicly known techniques and hence their detailed description is omitted.

The result notification section 115 transmits to the inquiry terminal 2 the result of judgment by the feature quantity comparison section 114. The similarity comparison section 116 compares with each other the similarities stored in the similarity temporary storage section 122. On the basis of the information stored in the similar target storage section 123, the update recommendation notification section 117 transmits update recommendation to the registration terminal 3.

For example, the request receiving section 111, the face detection section 112, the feature quantity extraction section 113, the feature quantity comparison section 114, the result notification section 115, the similarity comparison section 116, and the update recommendation notification section 117 are individually realized by a microcomputer system operated in accordance with a program or by a logic circuit or the like.

Figures 4, 5:
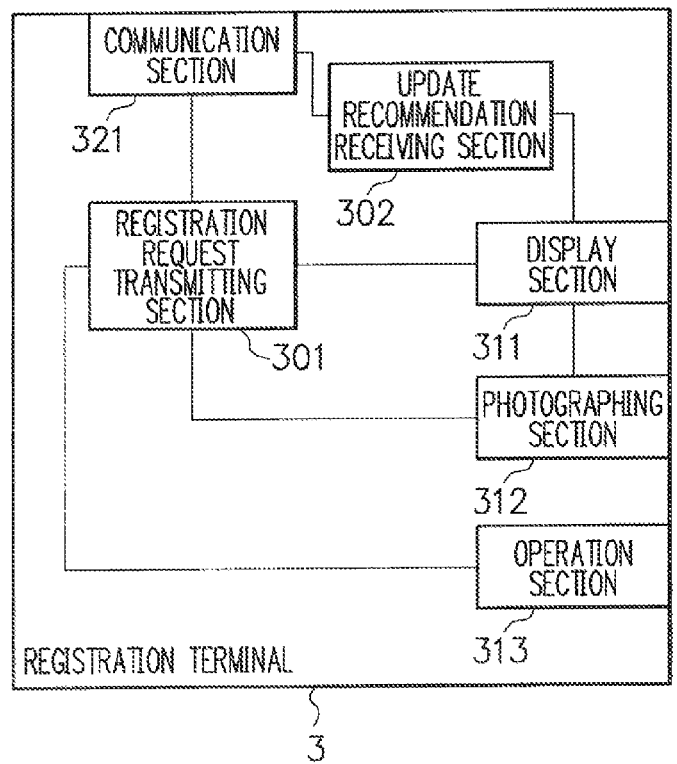
FIG. 4 is a block diagram showing a configuration of a registration terminal 3 in a first to a third embodiment of the present invention.
FIG. 5 is a block diagram showing a configuration of a dictionary data storage section 121 in a first to a third embodiment of the present invention.

The dictionary data storage section 121 stores dictionary data. FIG. 5 shows an example of the configuration of the dictionary data storage section 121. Referring to FIG. 5, the dictionary data storage section 121 is in the form of a table in which each row stores a set of the registered person ID, the registered person name, the registered person notification destination information, the image, and the feature quantity. The registered person ID is an identifier for identifying registration of the dictionary data. The registered person name is the person name of a face contained in the registered image. The registered person notification destination information is a notification destination used in notification to the registered person like the telephone number and the e-mail address of the registration terminal 3. The image is an image containing a face image. The feature quantity is a feature quantity extracted from a face image portion of the image.

The similarity temporary storage section 122 stores the similarity between the feature quantity extracted from the image received from the inquiry terminal 2 and the feature quantity of each row of the dictionary data storage section 121. FIG. 6 shows an example of the configuration of the similarity temporary storage section 122. Referring to FIG. 6, the similarity temporary storage section 122 is in the form of a table in which each row stores a set of the registered person ID and the similarity. The registered person ID is a registered person ID in the dictionary data storage section 121 serving as a similarity calculation target. The similarity is a calculated similarity.

When the relation of the similarities satisfies a predetermined condition, the similar target storage section 123 performs storage. FIG. 7 shows an example of the configuration of the similar target storage section 123. Referring to FIG. 7, the similar target storage section 123 is in the form of a table in which each row stores a set of a combination of registered person IDs (a pair of registered person IDs) and the number of times. The registered person IDs indicate a pair of registered person IDs whose relational property of similarity satisfies the predetermined condition. The number of times indicates the number of times of a situation that, for the combination of registered person IDs, the relational property of similarity satisfies the predetermined condition.

The dictionary data storage section 121, the similarity temporary storage section 122, and the similar target storage section 123 employ the same scheme of the registered person ID. Thus, data is related between storage sections by using the registered person ID. For example, the dictionary data storage section 121, the similarity temporary storage section 122, and the similar target storage section 123 are individually realized by a hard disk drive, a semiconductor memory, or the like.

The communication section 130 is an interface for performing communication with the inquiry terminal 2 or the registration terminal 3 through the communication network 4. For example, the communication section 130 is realized by an electronic circuit, an antenna, a cable connector, and the like.

The inquiry terminal 2 is a terminal for acquiring an image and then performing inquiry of recognition of a person in the image, to the recognition server 1.

FIG. 3 is a diagram showing air example of the internal structure of the inquiry terminal 2 shown in FIG. 1. The inquiry terminal 2 shown in FIG. 3 is constructed from an inquiry request processing section 201, a display section 211, a photographing section 212, an operation section 213, and a communication section 221.

The inquiry request processing section 201 processes an inquiry request. For example, the inquiry request processing section 201 is realized by a microcomputer system operated in accordance with a program or by a logic circuit or the like. The display section 211 is an interface for displaying information visually recognizable to the human. For example, the display section 211 is realized by a liquid crystal display.

The photographing section 212 acquires an image of the surroundings and then generates and stores image data. For example, the photographing section 212 is realized by a digital camera constructed from a lens, a CCD (Charge Coupled Device) image sensor, and the like.

The operation section 213 is an interface through which the human inputs operation. For example, the operation section 213 is realized by a keyboard constructed from physical buttons or by a touch panel or the like. The communication section 221 is an interface for performing communication with the recognition server 1 through the communication network 4. For example, the communication section 221 is realized by an electronic circuit, an antenna, a cable connector, and the like.

The registration terminal 3 is a terminal for acquiring an image and then registering a person in the image into the recognition server 1.

FIG. 4 is a diagram showing an example of the internal structure of the registration terminal 3 shown in FIG. 1. The registration terminal 3 shown in FIG. 4 is constructed from a registration request processing section 301, an update recommendation receiving section 302, a display section 311, a photographing section 312, an operation section 313, and a communication section 321.

The registration request processing section 301 performs registration request processing. The update recommendation receiving section 302 receives an update recommendation notification from the recognition server 1. For example, the registration request processing section 301 and the update recommendation receiving section 302 are individually realized by a microcomputer system operated in accordance with a program or by a logic circuit or the like.

The display section 311 is an interface for displaying information visually recognizable to the human. For example, the display section 311 is realized by a liquid crystal display. The photographing section 312 acquires an image of the surroundings and then generates and stores image data. For example, the photographing section 312 is realized by a digital camera constructed from a lens, a CCD image sensor, and the like.

The operation section 313 is an interface through which the human inputs operation. For example, the operation section 313 is realized by a keyboard constructed from physical buttons or by a touch panel or the like. The communication section 321 is an interface for performing communication with the recognition server 1 through the communication network 4. For example, the communication section 321 is realized by an electronic circuit, an antenna, a cable connector, and the like.

The communication network 4 is a network through which communication is performed between the authentication server 1 and the inquiry terminal. 2 and between the authentication server 1 and the registration terminal 3. The network may be wireless, cable, or a combination of wireless and cable.

[Description of Operation]

Next, operation in the present embodiment is described below with reference to flow charts. First, with reference to the flow chart of FIG. 8, description is given for operation performed when the recognition server 1 has received an inquiry request from the inquiry terminal 2. An image is contained in the inquiry request from the inquiry terminal 2.

When the request receiving section 111 of the recognition server 1 receives an inquiry request from the inquiry terminal 2, first, the face detection section 112 detects a face from an image contained in the inquiry request (step S101). When the face detection has been failed (step S102), the result notification section 115 transmits a recognition failure notification to the inquiry terminal 2 of transmission source of the inquiry request (step S114) and then terminates the processing. At step S102, when the face detection has been successful, the feature quantity extraction section 113 extracts a feature quantity of the detected face (step S103). Then, the feature quantity comparison section 114 compares the feature quantity extracted at step S103 with the feature quantity registered in each row of the dictionary data storage section 121 so as to calculate the similarity (step S104) and then stores the registered person ID corresponding to the compared feature quantity and the calculated similarity into the same row of the similarity temporary storage section 122 (step S105). The processing of steps S104 to S105 is repeated for the feature quantities in all rows registered in the dictionary data storage section 121 so that comparison with all rows has been completed (step S106), the feature quantity comparison section 114 searches a value of the highest similarity from among the similarities stored in the similarity temporary storage section 122 and then judges whether the highest similarity is higher than or equal to a recognition threshold (step S107).

Here, the recognition threshold is a value of similarity for setting forth a boundary of recognition of being the same person or not. Then, the recognition threshold is set to be a value in advance such as to reduce erroneous recognition that an image of another person is recognized as the same person and non-recognition that an image of the same, person is not recognized as the same person. At step S107, when the highest similarity is not higher than or equal to the recognition threshold, the result notification section 115 transmits a recognition failure notification to the inquiry terminal 2 of transmission source of the inquiry request (step S114) and then terminates the processing. At step S107, when the similarity maximum is higher than or equal to the recognition, threshold, the result notification section 115 transmits as target person information the registered person name of the corresponding registered person ID to the inquiry terminal 2 of transmission source of the inquiry request (step S108). Then, the similarity comparison section 116 compares the highest similarity extracted at step S107 with the similarity stored in each row among the rows in the similarity temporary storage section 122 except for the row in the registered person ID column of which the registered person ID corresponding to the highest similarity is stored, and thereby extracts rows whose difference is smaller than or equal, to a similarity threshold (step S109). Here, the similarity threshold is a difference between the similarities where persons are judged as resembling, and is set forth in advance.

At step S109, in the case of presence of a similarity lower than or equal to the similarity threshold, 1 is added to the numerical value in the number-of-times column in a row of the similar target storage section 123 having a pair (or a group of the registered person IDs) of the registered person ID corresponding to the highest similarity and the registered person ID corresponding to a similarity lower than or equal to the similarity threshold. In the case of absence of a row having a pair of registered person IDs corresponding to the similarity lower than or equal to the similarity threshold in the similar target storage section 123, a new row is added, then the pair of registered person IDs corresponding to a similarity lower than or equal to the similarity threshold is registered into the similar target storage section 123, and then 1 is registered into the number-of-times column (step S110). Then, the update recommendation notification section 117 judges the presence or absence of a value exceeding a number-of-times threshold in the number-of-times column of the similar target storage section 123 (step S111). Here, the number-of-times threshold is a value used as a trigger for recommendation of update. At step S111, in the case of absence of the number of times greater than or equal to the number-of-times threshold, the entire data stored in the similarity temporary storage section 122 is cleared (step S113) and then the processing is terminated. At step Sill, in the case of presence of the number of times greater than or equal to the number-of-times threshold, each registered person notification destination information of the pair of registered person IDs of the corresponding row is retrieved from the dictionary data storage section 121 and then an update recommendation notification is transmitted to the retrieved registered person notification destination information (step S112). Here, the update recommendation notification is a notification text containing a text of promoting update of the registered image. Then, the entire data stored in the similarity temporary storage section 122 is cleared (step S113) and then the processing is terminated.

Figure 9:
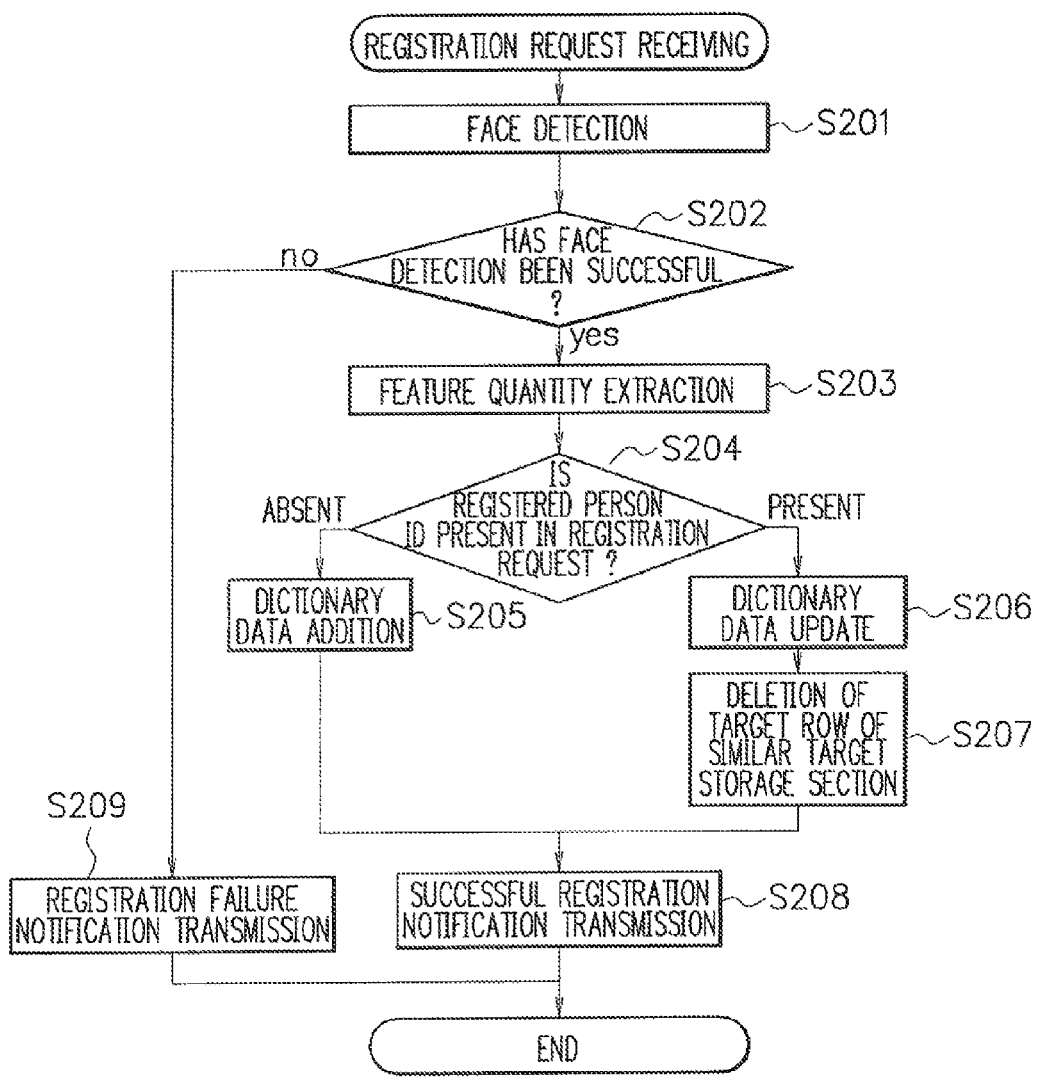
FIG. 9 is a flow chart describing operation of a recognition server 1 in a first to a third embodiment of the present invention.

Next, with reference to the flow chart of FIG. 9, description is given for operation performed when the recognition server 1 has received a registration request from the registration terminal 3.

In the case of a request of new registration, the registration request from the registration terminal 3 contains a registered person name, a registered person notification destination, and an image. In the case of not a new registered person, the registration request contains a registered person ID and an image.

When the request receiving section 111 of the recognition server 1 receives a registration request from the registration terminal 3, first, the face detection section 112 detects a face from an image contained in the inquiry request (step S201). When the face detection has been failed (step S202), the result notification section 115 transmits a registration failure notification to the inquiry terminal 2 of transmission source of the registration request (step S209) and then terminates the processing. At step S202, when the face detection has been successful, the feature quantity extraction section 113 extracts a feature quantity of the detected face (step S203). Then, when the registration request from the registration terminal 3 does not contain a registered person ID, the person is regarded as a new registered person. Thus, a row is added to the dictionary data storage section 121 and then the registered person name, the registered person notification destination information, and the image contained in the registration request as well as the feature quantity extracted at step S203 and a newly assigned registered person ID are stored (step S205). Then, a successful registration notification containing the newly assigned registered person ID is transmitted to the inquiry terminal 2 of transmission source of the registration request (step S208) and then the processing is terminated.

At step S204, when the registration request from the registration terminal 3 contains a registered person ID, the request is regarded as an information update request for a registered person having already been registered. Thus, in a row of the dictionary data storage section 121 whose registered person ID column agrees with the registered person ID contained in the registration request, the image is updated into the image contained in the registration request and then the feature quantity is update into the feature quantity extracted at step S203 (step S206). Further, rows of the similar target storage section 123 in which any one of the registered person ID columns agrees with the registered person ID contained in the registration request are deleted (step S207), then a successful registration notification is transmitted to the inquiry terminal 2 of transmission source of the registration request (step S208), and then the processing is terminated.

Next, with reference to the flow chart of FIG. 10, description is given for operation of the inquiry terminal 2 transmitting an inquiry request.

When receiving an inquiry start input from the operation section 213, the inquiry terminal 2 starts the processing. When receiving a shutter input from the operation section 213 (step S301), the photographing section 212 performs image taking and then displays the acquired image on the display section 211 (step S303). When the inquiry terminal operator (not shown) checks the image displayed on the display section 211 and then performs transmission input through the operation section 213 (step S304), the inquiry request processing section 201 transmits an inquiry request containing the acquired image, through the communication section 221 to the recognition server 1 (step S306) and then waits to receive a response from the recognition server 1 (step S307). At step S307, when receiving a response from the recognition server 1, the inquiry request processing section 201 judges whether the response is target person information or a recognition failure notification (step S308), then, when the response is target person information, displays the target person information on the display section 211 (step S309), and then terminates the processing.

At step S308, when the response is a recognition failure notification, a message of recognition failure is displayed on the display section 211 (step S310) and then the processing is terminated. Here, at step S301, in the case of absence of a shutter input, the presence or absence of a cancellation input from the operation section 213 is judged (step S302) and then, in the case of presence of a cancellation input, the processing is terminated. At step S302, in the case of absence of a cancellation input, the processing at and after step S301 is performed. Further, at step S304, in the case of absence of a transmission input, the presence or absence of a cancellation input from the operation section 213 is judged (step S305) and then, in the case of presence of a cancellation input, the processing is terminated. At step S305, in the case of absence of a cancellation input, the processing at and after step S304 is performed.

Next, with reference to the flow chart of FIG. 11, description is given for operation of the registration terminal 3 transmitting a registration request.

When receiving a registration input from the operation section 313, the registration terminal 3 starts the processing. When receiving a shutter input from the operation section 313 (step S401), the photographing section 312 performs image taking and then displays the acquired image on the display section 311 (step S403). When the registration terminal operator (not shown) checks the image displayed on the display section 311 and then performs transmission input through the operation section 313 (step S404), the registration request transmission section 301 transmits a registration request containing the acquired image, through the communication section 321 to the recognition server 1 (step S406) and then waits to receive a response horn the recognition server 1 (step S407). At step S407, when receiving a response from the recognition server 1, the registration request transmission section 301 judges whether the response is a successful registration notification or a registration failure notification (step S408), then, when the response is a successful registration notification, displays a successful registration message on the display section 311 (step S409), and then terminates the processing. At step S408, when the response is a registration failure notification, a registration failure message is displayed on the display section 311 (step S410) and then the processing is terminated.

Here, at step S401, in the case of absence of a shutter input, the presence or absence of a cancellation input from the operation section 313 is judged (step S402) and then, in the case of presence of a cancellation input, the processing is terminated. At step S402, in the case of absence of a cancellation input, the processing at and after step S401 is performed. Further, at step S404, in the case of absence of a transmission input, the presence or absence of a cancellation input from the operation section 313 is judged (step S405) and then, in the case of presence of a cancellation input, the processing is terminated. At step S405, in the case of absence of a cancellation input, the processing at and after step S404 is performed.

Next, with reference to the flow chart of FIG. 12, description is given for operation performed when the registration terminal 3 has received an update recommendation notification.

When receiving an update recommendation notification from the authentication server 1, the update recommendation receiving section 302 of the registration terminal 3 displays a message of having received an update recommendation notification onto the display section 311 (step S501) and then terminates the processing.

(Implementation Example 1)

Next, the first embodiment of the present invention is described below in further details with reference to a detailed example.

A case is considered that the dictionary data storage section 121 is as shown in FIG. 13 and the similar target storage section 123 is as shown in FIG. 19.

The recognition threshold in the recognition server 1 is premised to be 0.80, the similarity threshold is premised to be 0.10, and the number-of-times threshold is premised to be 5. At that time, it is premised that one of the inquiry terminals 2 has transmitted to the recognition server 1 an inquiry request containing an image obtained by image taking of the face of the person registered as the registered person ID=2 in the dictionary data storage section 121 of the recognition server 1.

Figure 8:
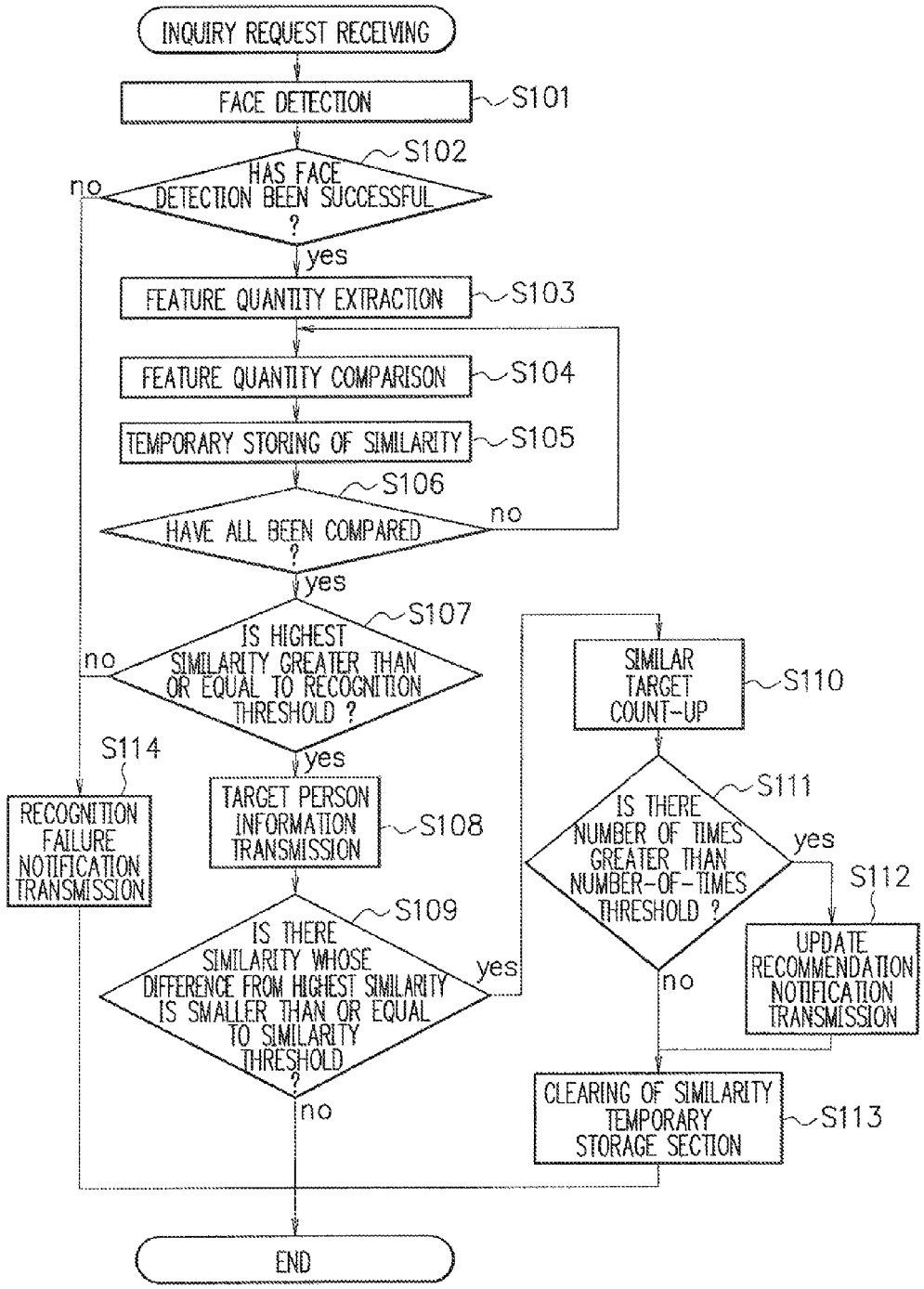
FIG. 8 is a flow chart describing operation of a recognition server 1 in a first embodiment of the present invention.

FIG. 16 shows the state of the similarity temporary storage section 122 realized at the time that the recognition server 1 has received an inquiry request, then performed the processing in accordance with the individual steps of FIG. 8, and thereby completed the entire comparison at step S106. It is premised that the similarity of the registered person ID=2 is 0.82 which is the highest, the similarity of the registered person ID=10 is 0.73 which is the second highest, and the similarity was 0.1 or lower for the other registered person IDs.

At step S107, the highest similarity of 0.82 is higher than or equal to the recognition threshold of 0.80. Thus, the data is recognized as being the face of the registered person registered as the registered person ID=2 and hence the registered person name BBB in the row of the registered person ID=2 in the dictionary data storage section 121 is transmitted as the target person information to the inquiry terminal 2 having transmitted the inquiry request (step S108). FIG. 22 shows an example of the state of the display section 211 of the inquiry terminal 2 in a situation that a response has been received from the recognition server 1 and then the target person information is displayed (step S309). At that time, in the recognition server 1, at step S109, the difference between the highest similarity of 0.82 (the registered person ID=2) and the similarity of the registered person ID=10 is 0.09 and hence is smaller than or equal to the similarity threshold of 0.10. Thus, 1 is added to the number of times=4 in the row of the similar target storage section 123 having a pair of registered person IDs consisting of the registered person ID=2 and the registered person ID=10, so that the number of times=5 is generated (step S110). FIG. 20 shows the state of the similar target storage section 123 at that time.

At that time, at step S111, the number of times=5 is obtained in the row of the similar target storage section 123 having a pair of registered person IDs consisting of the registered person ID=2 and the registered person ID=10, which is greater than or equal to the number-of-times threshold=5. Thus, an update recommendation notification is transmitted to the notification destinations (b@bb . . . and j@jj . . . , respectively) stored in the dictionary data storage section 121 as the registered person notification destination information of the registered person ID=2 and the registered person ID=10 (step S112) and then the subsequent processing is performed.

In this status, the feature quantities of the face of the person of registered person ID=2 and the face of the person of registered person ID=10 are similar and hence there is a high possibility of erroneous recognition between the faces of the registered person ID 2 and the registered person ID=10 depending on the method of acquiring a photograph in the inquiry terminal 2, a temporal change in any one face in the future, or the like.

At that time, among the registration terminals 3, registration terminals 3 (referred to as a registration terminal 3b and a registration terminal 3j, respectively) having b@bb . . . and j@jj . . . as notification destinations receive the update recommendation notification from the recognition server 1 and hence display the update recommendation (step S501 of FIG. 12). FIG. 23 shows an example of the state of the display section 311 of the registration terminal 3b at that time and FIG. 24 shows an example of the state of the display section 311 of the registration terminal 3j.

Next, it is premised that the operator of the registration terminal 3j has watched the update recommendation display and then, by using the registration terminal 3j, has transmitted to the recognition server 1 a registration request containing an image obtained by image taking of a face photograph of JJJ (the person of registered person ID=10).

In accordance with the individual steps of FIG. 9, the recognition server 1 updates the image and the feature quantity of the registered person ID 10 in the dictionary data storage section 121. FIG. 14 shows the state of the dictionary data storage section 121 posterior to the update. Further, at step S207, a row in which the registered person ID=10 is registered is deleted from the similar target storage section 123. FIG. 21 shows the state of the similar target storage section 123 at that time.

At that time, it is premised that one of the inquiry terminals 2 has transmitted again to the recognition server 1 an inquiry request containing an image obtained by new image taking of the face of the person registered as the registered person ID=2 in the dictionary data storage section 121 of the recognition server 1.

FIG. 17 shows the state of the similarity temporary storage section 122 realized at the time that the recognition server 1 has received an inquiry request, then performed the processing in accordance with the individual steps of FIG. 8, and thereby completed the entire comparison at step S106. It is premised that the similarity of the registered person ID=2 is 0.81 which is the highest, the similarity of the registered person ID=10 is 0.23 which is the second highest, and the similarity was 0.1 or lower for the other registered person IDs.

At step S107, the highest similarity of 0.81 is higher than the recognition threshold of 0.80. Thus, the data is recognized as being the face of the registered person registered as the registered person ID=2 and hence the registered person name BBB in the row of the registered person ID=2 in the dictionary data storage section 121 is transmitted as the target person information to the inquiry terminal 2 having transmitted the inquiry request (step S108). At that time, at step S109, the difference between the highest similarity of 0.82 (the registered person ID=2) and the similarity of the registered person ID=10 having the second highest similarity is 0.58 and hence is not lower than or equal to the similarity threshold of 0.10. Thus, the processing is terminated.

In this state, the dictionary data of the person of registered person ID=10 has been updated into the newest one having undergone a temporal change and hence the possibility of erroneous recognition between the faces of the registered person ID=2 and the registered person ID=10 has been reduced.

Next, description is given for a case that registration request is not performed from the registration terminal 3*j* described above and that the operator of the registration terminal 3*b* has watched the update recommendation display and then, by using the registration terminal 3*b*, has transmitted to the recognition server 1 a registration request containing an image obtained by image taking of a face photograph of BBB (the person of registered person ID=2).

In accordance with the individual steps of FIG. 9, the recognition server 1 updates the image and the feature quantity of the registered person ID=2 in the dictionary data storage section 121. FIG. 15 shows the state of the dictionary data storage section 121 posterior to the update. Further, at step S207, a row in which the registered person ID=10 is registered is deleted from the similar target storage section 123. FIG. 21 shows the state of the similar target storage section 123 at that time.

At that time, it is premised that one of the inquiry terminals 2 has transmitted again to the recognition server 1 an inquiry request containing an image obtained by new image taking of the face of the person registered as the registered person ID=2 in the dictionary data storage section 121 of the recognition server 1.

FIG. 18 shows the state of the similarity temporary storage section 122 realized at the time that the recognition server 1 has received an inquiry request, then performed the processing in accordance with the individual steps of FIG. 8, and thereby completed the entire comparison at step S106. It is premised that the similarity of the registered person ID=2 is 0.95 which is the highest, the similarity of the registered person ID=10 is 0.73 which is the second highest, and the similarity was 0.1 or lower for the other registered person IDs.

At step S107, the highest similarity of 0.95 is higher than the recognition threshold of 0.80. Thus, the data is recognized as being the face of the registered person registered as the registered person ID=2 and hence the registered person name BBB in the row of the registered person ID=2 in the dictionary data storage section 121 is transmitted as the target person information to the inquiry terminal 2 having transmitted the inquiry request (step S108). At that time, at step S109, the difference between the highest similarity of 0.95 (the registered person ID=2) and the similarity of the registered person ID=10 having the second highest similarity is 0.22 and hence is not lower than or equal to the similarity threshold of 0.10. Thus, the processing is terminated.

In this state, the dictionary data of the person of registered person ID=2 has been updated into the newest one having undergone a temporal change and hence the possibility of erroneous recognition between the faces of the registered person and the registered person ID=10 has been reduced.

As described above, in the first embodiment of the present invention, when there are faces having similar feature quantities, update of the registered image is promoted to both persons of resembling faces so that the possibility of erroneous recognition can be reduced.

Further, in the first embodiment of the present invention, when there are faces having similar feature quantities, update of the registered image is promoted. This can suppress generation of update of the dictionary data whose contribution to improvement in the recognition accuracy is small.

<Second Embodiment>

Next, a second embodiment of the present invention is described below.

The second embodiment is different from the first embodiment in the configuration of the similar target storage section 123 and in the operation performed when the update server 1 has received an inquiry request. FIG. 25 shows the configuration of the similar target storage section 123 in the present embodiment, which is different from the similar target storage section 123 of the first embodiment in the point that the column for storing the number of times is not provided.

Figure 26:
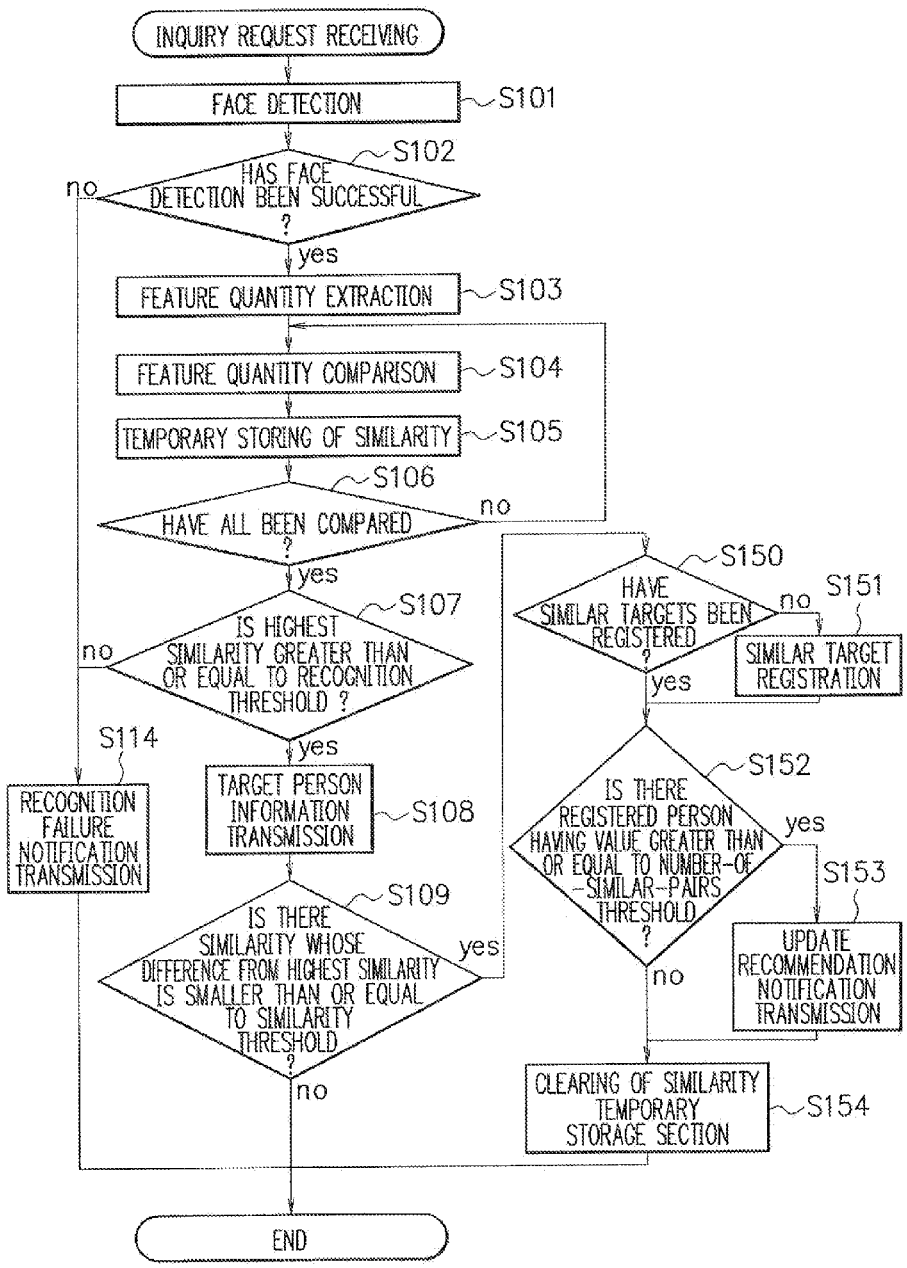
FIG. 26 is a flow chart describing operation of a recognition server 1 in a second embodiment of the present invention.

The operation performed when the update server 1 in the present embodiment has received an inquiry request is described below with reference to the flow chart of FIG. 26. The steps of S101 to S109 and S114 are the same as those of the first embodiment. However, operation performed when a similarity whose difference from the highest similarity is lower than or equal to the similarity threshold is present at step S109 is different. At step S109, in the case of presence of a similarity lower than or equal to the similarity threshold, when a row having a pair of the registered person ID corresponding to the highest similarity and a registered person ID corresponding to a similarity lower than or equal to the similarity threshold is absent in the similar target storage section 123 (step S150), a new row is added to the similar target storage section 123 and then a pair of the registered person ID corresponding to the highest similarity and the registered person ID corresponds to the similarity lower than or equal to the similarity threshold is registered (step S151).

At step S150, when a row having a pair of the registered person ID corresponding to the highest similarity and a registered person ID corresponding to a similarity lower than or equal to the similarity threshold is present in the similar target storage section 123 or alternatively, after step S151, the presence or absence of a registered person ID registered in the similar target storage section 123 in rows in a number greater than or equal to a number-of-similar-pairs threshold is checked (step S152). Here, the number-of-similar-pairs threshold is a value used as a trigger for recommendation of update. At step S152, in the case of absence of a registered person ID registered in rows in a number greater than or equal to the number-of-similar-pairs threshold, the entire data stored in the similarity temporary storage section 122 is cleared (step S153) and then the processing is terminated. At step S152, in the case of presence of a registered person ID having a value greater than or equal to the number-of-similar-pairs threshold, the registered person notification destination information of the registered person ID of the corresponding row is retrieved from the dictionary data storage section 121 and then an update recommendation notification is transmitted to the retrieved registered person notification destination information (step S153). Here, the update recommendation notification is a notification text containing a text of promoting update of the registered image. Then, the entire data stored in the similarity temporary storage section 122 is cleared (step S154) and then the processing is terminated.
(Implementation Example 2)

Next, the second embodiment of the present invention is described below in further details with reference to a detailed example. A case that the state of the similar target storage section 123 is as shown in FIG. 27 is considered. The number-of-similar-pairs threshold is premised to be 5.

It is premised that the recognition server 1 has received an inquiry request from one of the inquiry terminals 2. Then, at step S107, the registered person ID=20 is premised to have the highest similarity and, at step S109, the difference between the similarity of the registered person ID=10 and the highest similarity is premised to be lower than or equal to the similarity threshold. At step S150, a pair of the registered person ID=20 and the registered person ID=10 is not registered in the similar target storage section 123. Thus, a new row is added to the similar target storage section 123 so that the registered person ID=20 and the registered person ID=10 are registered (step S151). FIG. 28 shows the state of the similar target storage section 123 at that time. At step S152, the number of rows in which the registered person ID=10 is registered in the similar target storage section 123 is 5 and hence is greater than or equal to the number-of-similar-pairs threshold. Thus, the registered person notification destination information of the registered person ID=10 is retrieved from the dictionary data storage section 121, then an update recommendation notification is transmitted to the retrieved registered person notification destination information (step S153), and then the similarity temporary storage section 122 is cleared (step S154).

Next, when receiving a registration request for the registered person ID=10 from one of the registration terminals 3, the recognition server 1 updates the dictionary data in accordance with the flow chart of FIG. 9 (step S206) and then deletes from the similar target storage section 123 the rows in which ID=10 is registered (step S207). FIG. 29 shows this state of the similar target storage section 123.

As described above, in contrast to the first embodiment of the present invention where an update recommendation notification has been transmitted when the similarity between two registered persons has become high, in the second embodiment, an update recommendation notification is transmitted to a registered person whose similarity has become high relative to registered persons in a number greater than or equal to a fixed number.

As such, in object recognition using image information, erroneous judgment can be reduced that is caused when the similarity between a visual feature of the object image and a visual feature of dictionary data of another object becomes high in association with a temporal change. This is because the dictionary data of an object having a high similarity is updated in response to a trigger of update recommendation so that the possibility of reduction of the similarity is increased.

Further, according to the present invention, the update frequency for the dictionary data can be reduced. This is because update of the similarity data is promoted on the basis of the similarity to another object registered in the dictionary so that data update whose contribution to improvement in the recognition accuracy is small can be reduced.

<Third Embodiment>

Next, a third embodiment of the present invention is described below. The third embodiment is different from the first embodiment in the operation performed when the update server 1 has received an inquiry request.

Figure 30:
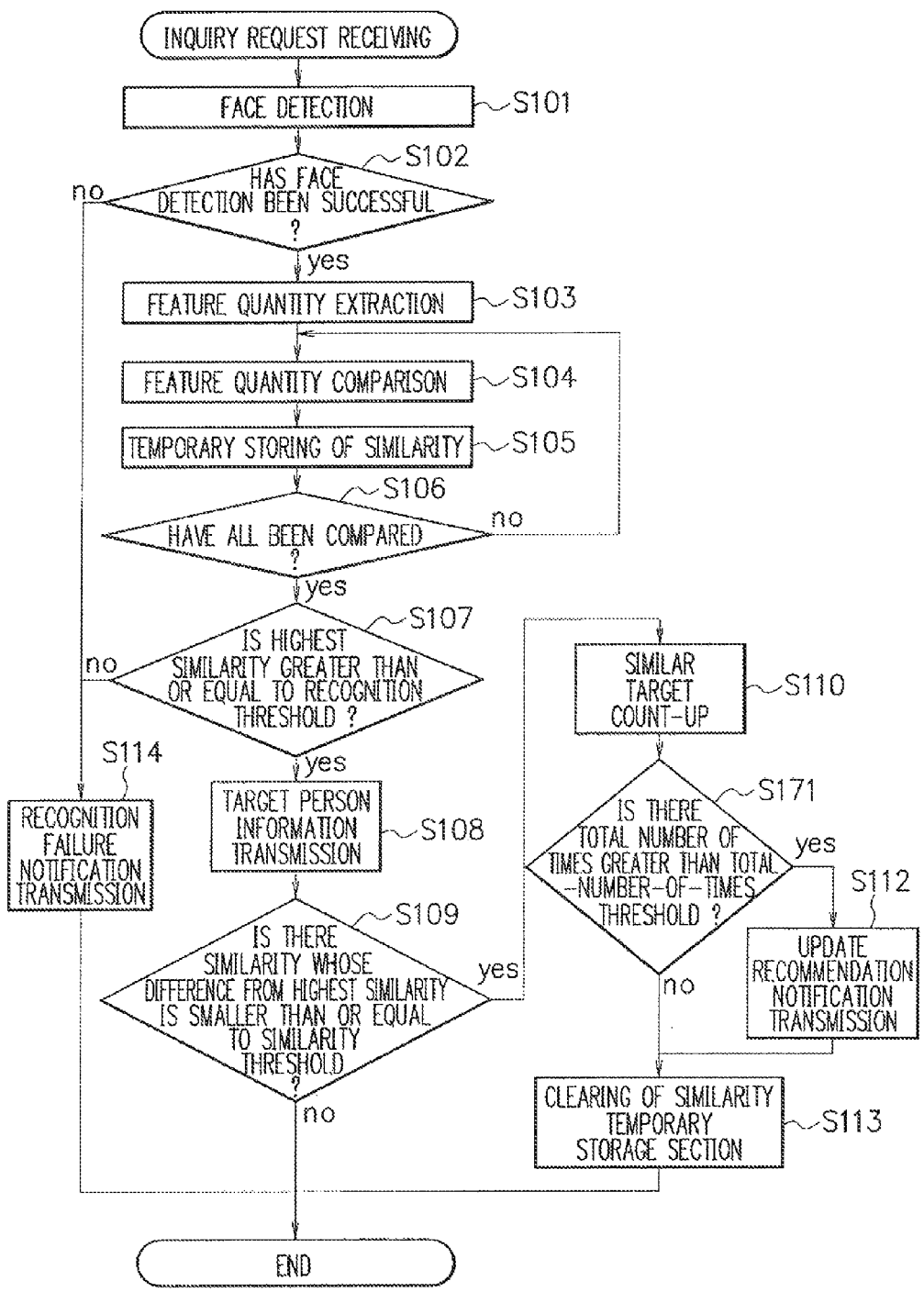
FIG. 30 is a flow chart describing operation of a recognition server 1 in a third embodiment of the present invention.

The operation performed when the update server 1 in the present embodiment has received an inquiry request is described below with reference to the flow chart of FIG. 30. The difference from the first embodiment is present only in step Sill of FIG. 8 which is a flow chart performed when the update server 1 has received an inquiry request in the first embodiment.

In the present embodiment, after step S110, for the registered person IDs registered in the similar target storage section 123, the update recommendation notification section 117 sums up for each registered person ID the values in the number-of-times column of all rows where the registered person ID is registered and then checks the presence or absence of a registered person ID exceeding a total-number-of-times threshold (step S171). Here, the total-number-of-times threshold is a value used as a trigger for recommendation of update. At step S171, in the case of absence of a registered person ID having the total number of times greater than or equal to the total-number-of-times threshold, the processing of step S113 transition is performed. At step S171, in the case of presence of a registered person ID having the total number of times greater than or equal to the total-number-of-times threshold, the processing of step S112 transition is performed.
(Implementation Example 3)

Next, the third embodiment of the present invention is described below in further details with reference to a detailed example. A case that the state of the similar target storage section 123 is as shown in FIG. 31 is considered. The total-number-of-times threshold is premised to be 8.

It is premised that the recognition server 1 has received an inquiry request from one of the inquiry terminals 2. Then, at step S107, the registered person ID=1 is premised to have the highest similarity and, at step S109, the difference between the similarity of the registered person ID=10 and the highest similarity is premised to be lower than or equal to the similarity threshold. At step S110, 1 is added to the number of times=1 in the row where a pair of the registered person ID=1 and the registered person ID=10 is registered so that the number of times=2 is generated. FIG. 32 shows the state of the similar target storage section 123 at that time. Then, for the registered person IDs registered in the similar target storage section 123, for each registered person ID, the values in the number-of-times column of all rows where the registered person ID is registered are summed up. The registered person ID=10 has the total number of times of 8 which is greater than or equal to the total threshold. Thus, the registered person notification destination information of the registered person ID=10 is retrieved from the dictionary data storage section 121, then an update recommendation notification is transmitted to the retrieved registered person notification destination information (step S112), and then the similarity temporary storage section 122 is cleared (step S113).

Next, when receiving a registration request for the registered person ID=10 from one of the registration terminals 3, the recognition server 1 updates the dictionary data in accordance with the flow chart of FIG. 9 (step S206) and then deletes from the similar target storage section 123 the rows in which ID=10 is registered (step S207). FIG. 33 shows this state of the similar target storage section 123.

Here, the configuration and the operation of the first to the third embodiment are an example for implementing the present invention. Thus, various modifications can be made. For example, description has been given for a case that the recognition server 1 has a configuration for extracting a feature quantity horn an image. Instead, both or any one of the inquiry terminal 2 and the registration terminal 3 may have a configuration for extracting a feature quantity from an image and then the inquiry request or the registration request may contain a feature quantity rather than an image.

Further, the inquiry terminal 2 and the registration terminal 3 may be not separate terminals. That is, both terminals may have both functions. Description has been given for a configuration in which the recognition server 1 and one or more inquiry terminals 2 perform communication through the communication network 4. Instead, a configuration may be employed that the recognition server 1 and the inquiry terminal 2 are arranged in the same device. It has been premised that the inquiry terminal 2 performs image taking or inquiry request in response to a trigger of input from the operation section. Instead, the image taking and the inquiry request may be performed allows or, alternatively, at a timing set forth in advance. Further, the recognition server 1 may be constructed from a plurality of devices such as a computer device and a storage device.

Further, description has been given for a case that the inquiry terminal 2 and the registration terminal 3 perform inquiry request and registration request by using an image acquired by the photographing section. Instead, for example, a configuration may be employed that both or any one of the inquiry terminal 2 and the registration terminal 3 includes an image storage section for storing an image and then performs inquiry request or registration request by using the image stored in the image storage section.

Further, in the first embodiment and third embodiment, a configuration has been employed that the similar target storage section has the number-of-times column. Instead, the number-of-times column may be not provided and then a pair of registered person IDs may be added and stored into a new row. After that, in the first embodiment, the number of rows having a pair relative to the same registered person ID may be counted and then the presence or absence of a pair of registered person IDs whose counted number exceeds the number-of-times threshold may be checked. Further, in the third embodiment, the number of the same registered person ID may be connected and then the presence or absence of a registered person ID whose counted number exceeds the total-number-of-times threshold may be checked.

Further, in the first embodiment, a configuration has been employed that an update recommendation notification is transmitted to both of the registered person pair having a value higher than or equal to the number-of-times threshold. Instead, the notification may be transmitted to any one of the registered persons.

Further, in the first to the third embodiment, description has been given for a case that a person is identified by using a feature quantity of a face image. However, the present invention may be applied to a general system for identifying an object contained in an image by using the similarity of a visual feature contained in the image.

INDUSTRIAL APPLICABILITY

As an example of application, the present invention may be applied to a security system, an information providing system, or the like.

DESCRIPTION OF REFERENCE NUMERALS

1 Recognition server
111 Request receiving section
112 Face detection section
113 Feature quantity extraction section
114 Feature quantity comparison section
115 Result notification section
116 Similarity comparison section
117 Update recommendation notification section
121 Dictionary data storage section
122 Similarity temporary storage section
123 Similar target storage section
130 Communication section
2 Inquiry terminal
201 inquiry request processing section
211 Display section
212 Photographing section
213 Operation section
221 Communication section
3 Registration terminal
301 Registration request transmitting section
302 Update recommendation receiving section
311 Display section
312 Photographing section
313 Operation section
321 Communication section
4 Communication network

The invention claimed is:

1. A dictionary update method for updating dictionary data in which a face visual feature of an object which a user desires to recognize is registered, the method comprising:
   accumulating a pair of objects into a similar object accumulation section, visual features of a plurality of objects are concluded as being similar, when there are a plurality of data pieces having a visual feature similar to an inputted inquiry image; and
   recommending update to each user having registered the pair of object, data having the visual features of the pair of objects having reached the condition is concluded as requiring update, when the pair of objects accumulated in the similar object accumulation section have reached a condition set forth in advance.

2. The dictionary update method according to claim 1, detecting an object from the inputted inquiry image;
   extracting a visual feature from the detected object;
   calculating a similarity between the extracted visual feature of the inputted inquiry image and the visual feature of the object desired to be recognized having been registered in advance as data by the user;
   identifying on the basis the calculated similarity, the object contained in the inputted inquiry image.

3. The dictionary update method according to claim 1, further comprising performing the recommendation of update to a user having registered the object when the number of times of accumulation of the pair relative to a particular object exceeds the number of times set forth in advance.

4. The dictionary update method according to claim 1, further comprising performing the recommendation of update to a user having registered the object when the number of counterparts accumulated as a pair relative to a particular object exceeds a number set forth in advance.

5. The dictionary update method according to claim 1, further comprising performing the recommendation of update to a user having registered the object when a total of the number of times of accumulation of a particular object as a pair relative to another object exceeds a number set forth in advance.

6. A dictionary update system for updating dictionary data in which a face visual feature of an object which a user desires to recognize is registered as data, comprising:

a similar object accumulation section for, when there are a plurality of data pieces having a visual feature similar to an inputted inquiry image, concluding visual features of a plurality of objects as being similar, and hence accumulating the pair of objects into; and an update recommendation notification section for, when the pair of objects accumulated in the similar object accumulation section have reached a condition set forth in advance, concluding data having the visual features of the pair of objects having reached the condition, as requiring update, and hence recommending and notifying update to each user having registered the pair of object.

7. A non-transitory computer readable recording medium storing:

the procedure of updating dictionary data in which a face visual feature of an object which a user desires to recognize is registered as data;

the procedure of accumulating the pair of objects into a similar object accumulation section, when there are a plurality of data pieces having a visual feature similar to an inputted inquiry image, concluding visual features of a plurality of objects as being similar; and the procedure of recommending update to each a user having registered the pair of object, when the pair of objects accumulated in the similar object accumulation section have reached a condition set forth in advance, concluding data having the visual features of the pair of objects having reached the condition, as requiring update.

8. The dictionary update method according to claim 2, further comprising performing the recommendation of update to a user having registered the object when the number of times of accumulation of the pair relative to a particular object exceeds the number of times set forth in advance.

9. The dictionary update method according to claim 2, further comprising performing the recommendation of update to a user having registered the object when the number of counterparts accumulated as a pair relative to a particular object exceeds a number set forth in advance.

10. The dictionary update method according to claim 2, further comprising performing the recommendation of update to a user having registered the object when a total of the number of times of accumulation of a particular object as a pair relative to another object exceeds a number set forth in advance.

* * * * *